(12) United States Patent
Hall et al.

(10) Patent No.: US 6,982,731 B2
(45) Date of Patent: Jan. 3, 2006

(54) METHOD AND SYSTEM FOR REMOTELY PROVIDING USER-DEFINED CUTTING FILES FOR CNC ROBOTIC TOOLS

(75) Inventors: Warren G. Hall, Durham, NC (US); William L. Young, Willis Wharf, VA (US)

(73) Assignee: ShopBot Tools, Inc., Durham, NC (US)

( * ) Notice: Subject to any disclaimer, the term of this patent is extended or adjusted under 35 U.S.C. 154(b) by 71 days.

(21) Appl. No.: 10/065,089

(22) Filed: Sep. 16, 2002

(65) Prior Publication Data

US 2004/0051720 A1 Mar. 18, 2004

(51) Int. Cl.
G09G 5/00 (2006.01)
G06F 19/00 (2006.01)
G06F 15/16 (2006.01)

(52) U.S. Cl. .............. 345/689; 700/182; 709/203
(58) Field of Classification Search ........... 345/689; 700/182; 709/203
See application file for complete search history.

(56) References Cited

U.S. PATENT DOCUMENTS

| | | | | |
|---|---|---|---|---|
| 4,660,148 A | * | 4/1987 | Kishi et al. | 700/182 |
| 5,576,946 A | * | 11/1996 | Bender et al. | 700/17 |
| 5,576,965 A | | 11/1996 | Akasaka et al. | |
| 5,930,769 A | | 7/1999 | Rose | |
| 5,960,411 A | | 9/1999 | Hartman et al. | |
| 5,999,908 A | | 12/1999 | Abelow | |
| 6,070,106 A | | 5/2000 | Hall | |
| 6,083,267 A | | 7/2000 | Motomiya et al. | |
| 6,112,133 A | * | 8/2000 | Fishman | 700/182 |
| 6,128,545 A | * | 10/2000 | Miller | 700/137 |
| 6,167,325 A | | 12/2000 | Kamiguchi et al. | |
| 6,206,750 B1 | | 3/2001 | Barad et al. | |
| 6,389,322 B1 | * | 5/2002 | Park et al. | 700/98 |
| 6,397,117 B1 | * | 5/2002 | Burrows et al. | 700/97 |
| 6,414,693 B1 | | 7/2002 | Berger et al. | |
| 6,675,055 B1 | * | 1/2004 | Fischer | 700/97 |
| 6,731,995 B2 | * | 5/2004 | Takeuchi | 700/96 |
| 6,889,114 B2 | * | 5/2005 | Nakamura | 700/182 |
| 2002/0194581 A1 | * | 12/2002 | Keener | 717/136 |
| 2004/0083023 A1 | * | 4/2004 | Suh et al. | 700/187 |
| 2004/0138775 A1 | * | 7/2004 | Bigelow | 700/182 |

OTHER PUBLICATIONS

Predator DNC. DNC Networking & Communications, Predator Software Inc. 2000-2001.*

"DNC Communcation —RealVision Inc. - 05/01", (Press Release) Sep. 11, 2001.*

ROBO Systems, (Online Publication) web archive 1999-2001.*

(Continued)

Primary Examiner—Ryan Yang
(74) Attorney, Agent, or Firm—Moore & Van Allen, PLLC; Matthew W. Witsil; Steven B. Phillips (57) ABSTRACT

A method and apparatus for interactive generation and provision of custom cutting files for CNC robotic tools. A generic model for a particular product that a user wishes to make with a CNC tool is provided on a server remote from a client, with corresponding representational images available to the user. The user may input changes to the default representational images, and transmit the data corresponding to the final design parameters to a remote site, where a custom cutting file is generated. The user executes a purchase of the custom cutting file, which is then transmitted or otherwise provided to the user.

35 Claims, 8 Drawing Sheets

OTHER PUBLICATIONS

Web Page for Custom Ink, http://www.customink.com, printed Sep. 7, 2001.
Web Page for Lands End, http://www.landsend.com, printed Sep. 7, 2001.
Web Page for Cabinet Vision, Inc., http://www.cabinetvision.com, printed Sep. 6, 2001.
Web Page for Cabnetware, http://www.cabnetware.com, printed Sep. 12, 2001.

* cited by examiner

METHOD AND SYSTEM FOR REMOTELY PROVIDING USER-DEFINED CUTTING FILES FOR CNC ROBOTIC TOOLS

BACKGROUND OF INVENTION

The use of computer numerically controlled (CNC) robotic tools has become increasingly prevalent in recent years. With the advent of individual machines that are relatively affordable, the number of personal use, home shop systems as well as small-scale commercial use systems has grown accordingly. Concurrently, the Internet, a vast, public communications network of interconnected computers and smaller networks, has developed to provide a vehicle for the purchasing of goods and services by consumers. Although in general e-commerce or online shopping transactions are reasonably common, their use in the CNC field is infrequent.

CNC tools may generally be three-axis, four-axis, or five-axis machines. A three-axis machine is one that allows the tool to move linearly along mutually orthogonal X, Y, and Z axes of a fixed coordinate system. A four-axis machine is one that allows the tool to move linearly along mutually orthogonal X, Y, and Z axes of a fixed coordinate system and also allows rotation of a workpiece about a rotary axis. A five-axis machine usually puts a wrist-like fourth and fifth axis on the Z arm of a three-axis machine to allow full tangential motion of a cutter in relation to the work surface. Numerical control allows digital accuracy to position the axes of a machine and to control other factors such as the cutting speeds and feeds for a machining pattern. This positioning and control information (the Numerical Control (NC) data) makes up an NC part program or cutting file that is created by a programmer. It can be used repeatedly to make multiple parts. After they are created, the cutting files are stored in a memory of the control system of the CNC tool. The CNC tool reads the cutting file in order to machine a part.

The cutting file directs the machine through a series of steps. The instructions direct the tool with respect to where the workpiece is to be cut and in what order the cuts are to be made. The cuts may be straight line or circular. Once the CNC program is written and stored in the controller, manual action is normally limited to setting up the part, starting the CNC controller that executes the program, and carrying out any necessary manual operations such as tool changes.

There are several ways that a cutting file may be created. Use of a punched tape is a method with which NC programming originated. More recently, portions of an NC program can be created and loaded directly into the controller memory by teaching the machine with a hand held programmer.

Many CNC systems are programmed according to a standard of the Electronic Industries Association designated as EIA RS 274-D. This standard defines G-codes, also known as movement and preparatory functions, and M-codes, also known as miscellaneous functions, which are used in sequence to direct the machine tool. Individual CNC manufacturers and programmers may use these codes, define their own, or incorporate a combination of both in their own software that reads and writes cutting files. One such proprietary code is by ShopBot Tools, Inc. of Durham, N.C. The software generally converts between standard and proprietary codes through the use of conversion tables.

Cutting files can be created through various methods, most of which are available to users of relatively expensive, large-scale commercial CNC systems, but may not be readily available for less expensive small-scale commercial or home shop systems. The most direct method is for a programmer to write the code, line by line, on a personal computer (PC) using a text editor. This requires that the programmer have knowledge of all of the EIA or proprietary codes, the required syntax, and the ability to calculate positions and movements.

A menu-driven system, commonly called conversational programming, is another method for creating a cutting file, in which the programmer simply responds to queries from the controller and fills in the blanks in a displayed form. The controller then creates the NC code required to generate the motions defined by the programmer.

A method that generally requires more expensive software for creating NC code for a cutting file is through use of a Computer Aided Design/Computer Aided Manufacturing (CAD/CAM) system. Using a CAD/CAM system, the programmer first defines the geometry of the part and then the cutting path. The system software then determines the desired cut path on the particular machine. In addition there are specialized CAD/CAM programs that can be used for certain types of objects, such as signs or kitchen cabinets.

Lacking the more complicated software or the training to use it, it is difficult to create cutting files for complex objects, and making manual modifications to a cutting file is a tedious process.

SUMMARY OF INVENTION

The present invention provides an interactive way to generate and provide custom cutting files for use with a CNC robotic tool. In one embodiment, a method for providing a cutting file for a CNC tool to a customer or user includes providing on a server remote from the user a generic model for a product to be made by the user. A corresponding representational image having default design parameters is displayed to the customer, and the customer can choose to modify the image by changing the design parameters as desired. Then the user selects final design parameters. In some embodiments a new, customized image is generated and displayed after the user changes design parameters for the image, incorporating any changes directed by the user. Data corresponding to the final design parameters is received at a site remote from the user. At the remote site, a cutting file is generated using the model, reflecting the final design parameters. The custom cutting file is then made available to the user, for example, by transmitting the file to the user or posting the file on an Internet web page accessible by the user. The transmission of the cutting file may further include the step of executing a sale. The display may also include display of individual parts of the product to be made. Some embodiments of the invention also include apparatus for performing the above functions. In some embodiments, a computer program provides instructions for performing each of the above functions.

Some embodiments include a computer readable memory system encoded with a data structure for enabling provision of a cutting file for a computer numerical control robotic tool to a customer. The memory system is accessible over a network. The data structure comprises generic models for products to be made by a customer, and representational images corresponding to the products and having default design parameters.

In other embodiments, a method for a customer to acquire a cutting file for a CNC robotic tool is addressed from the perspective of the customer or user. The user views a representational image of the product corresponding to a generic model for the product and having default design parameters. The user identifies and inputs any desired modifications to the design parameters, and views a final representational image that reflects final design parameters. The user transmits data reflecting the final design parameters to a remote site, and then requests and receives a cutting file from the remote site, corresponding to the final design parameters.

DETAILED DESCRIPTION

Figure 1:
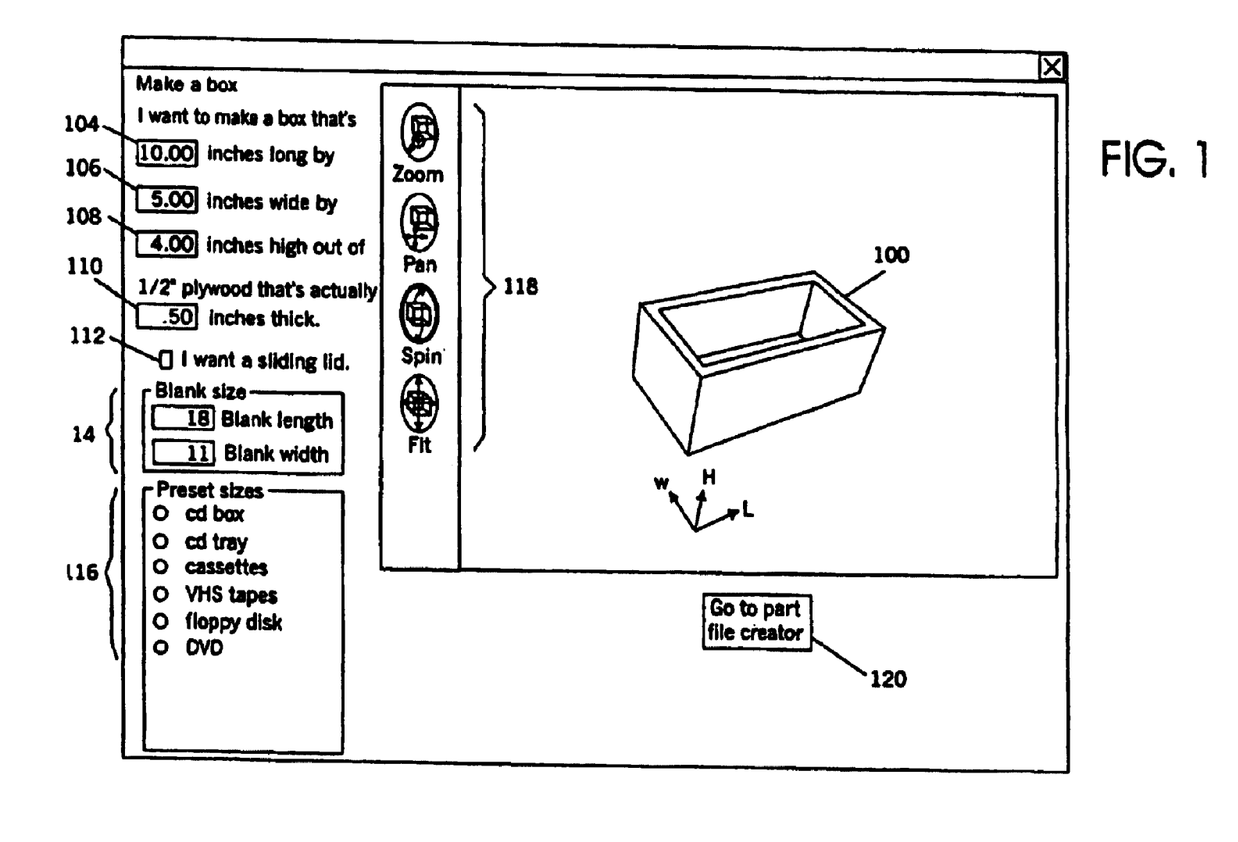
FIG. 1 is an example screen display of a product having default design parameters that might be encountered by a user of an embodiment of the present invention.
Figure 2:
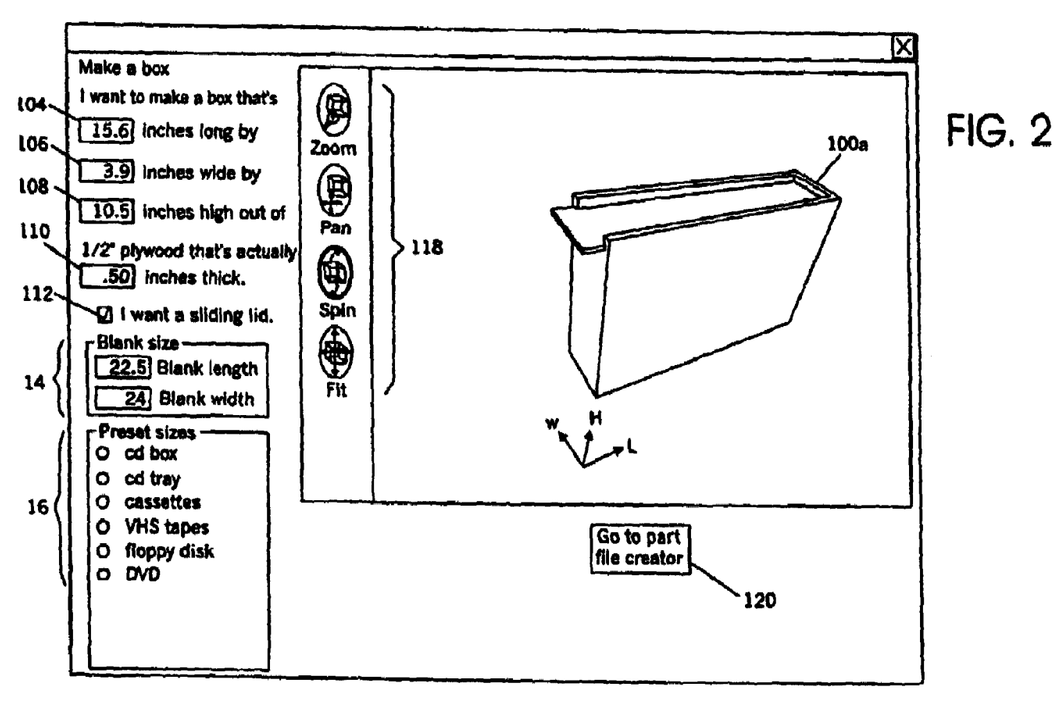
FIG. 2 is an example screen display that might be generated as the result of modifications to default design parameters input by the user to the screen display in FIG. 1.

FIG. 1 shows a computer screen image of one embodiment of the present invention, including a default image for a product, in this case a box, that a user may wish to make with his or her CNC tool. The box 100 has default design parameters, such as the parameters that make up size, and was previously selected as the product type by the user. Various design parameters may be modified by the user, including the length 104, width 106, and height 108 of the box 100, as well as the thickness 110 of the material to be used. Further, the features of the product may be selected; for example, the user may choose to include a sliding lid 112. The dimensions of the material from which the pieces will be cut, or the blank 114, are also input. A user may also select certain preset sizes 116, and may alter viewing angle of the image using commands 118. FIG. 2 shows an image of a box 100 a that has been redrawn to reflect the input of the user. After the image of the product is redrawn and the parameters are determined to be satisfactory by the user, for the purposes of this example, the option to go to part file creator 120 is depressed. Then the image shown in FIG. 3 is created.

Figure 3:
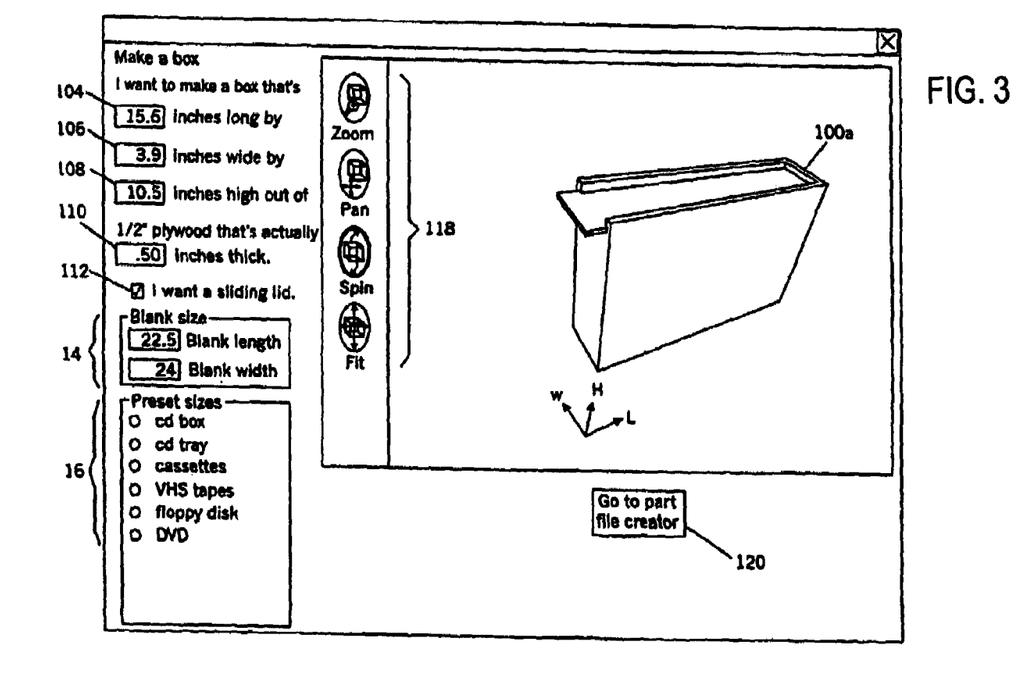
FIG. 3 is an example screen display of individual parts of the product that might be generated based on the user modifications of FIG. 2.

Input of system parameters and, in particular, tool-related data, such as the vacuum hose size and type 122 on the CNC tool and the bit size 124, are provided by the user on the screen shown in FIG. 3. Then the user may view collectively, in sequence, or a combination of both, each piece 126 that makes up the product. Further, if the user wants to make a change to the design, the back to design mode option 128 is depressed and returns the user to the screen of FIG. 2 for modification of parameters 104, 106, 108, 110, 112, 114, 116 as desired. When the screen of FIG. 3 is complete, the option to contact server to make cutting files 130 is depressed. This cutting file is sometimes referred to herein as a custom cutting file because the file is generated depending on the final design parameters selected by the user. The portion of the software that carries out the present invention as shown in FIGS. 1–3 is referred to herein as the design interface module.

Figure 4:
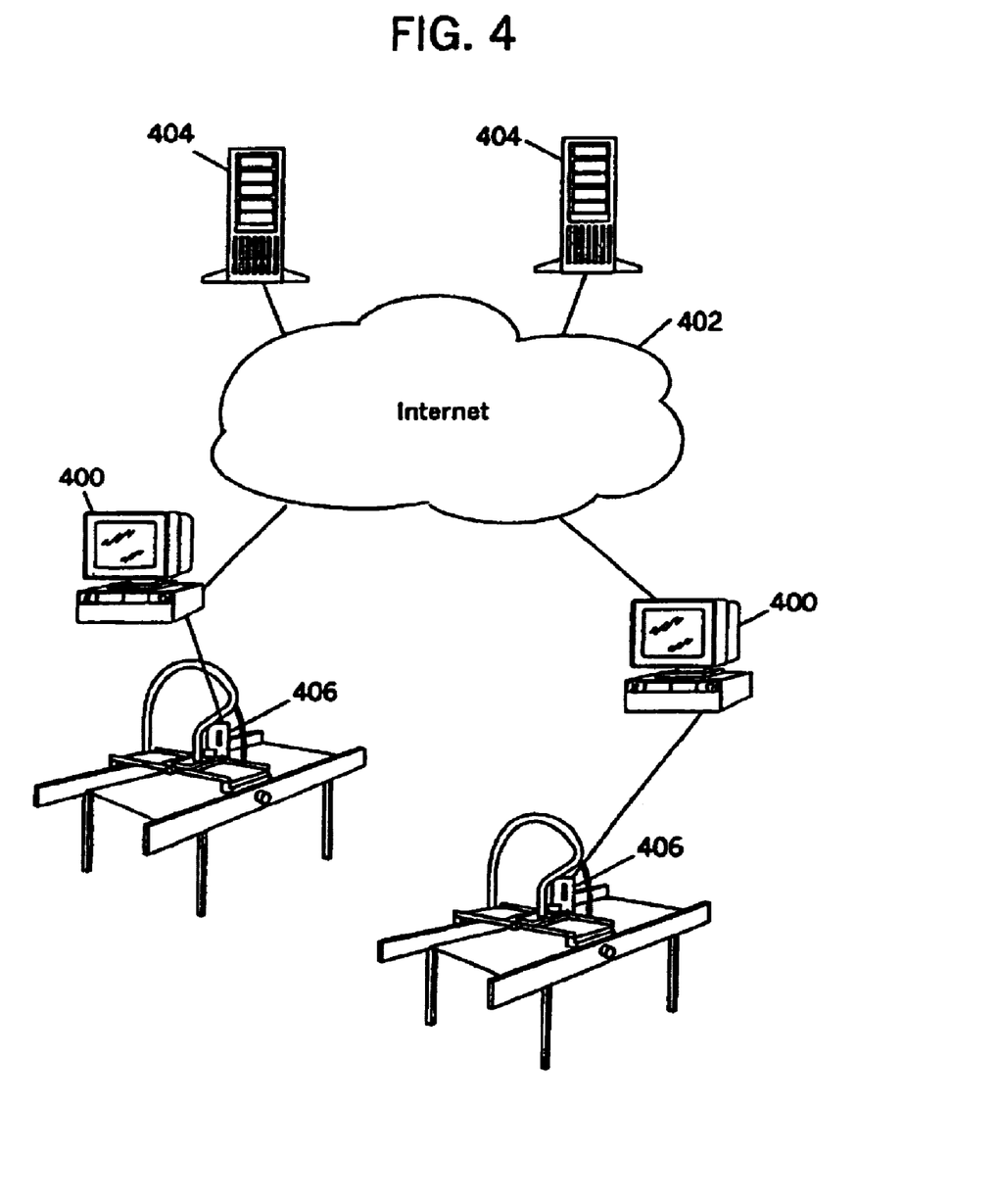
FIG. 4 is a network block diagram that illustrates both the network architecture and the overall method according to one embodiment of the invention.

FIG. 4 illustrates an example operating environment of the invention. Clients 400 communicate through the Internet 402 with a server system 404 and directly communicate with a CNC tool 406. The servers 404 transmit data to the clients 400 as required. While one of ordinary skill in the art will recognize that client systems 400 may include servers and may be part of a network (for example, Wide Area Network or Local Area Network), when reference is made herein to a server, the reference is to the server system 404 on the opposite side of the Internet 402 or other communication route from an individual user. A client 400 may comprise a client system network, with individual personal computers or terminals linked together, or may simply be one personal computer with a communication line to the server. Such a communication line may be, for example, through the Internet 402, leased line, local area network, point to point dial-up connection, or other known means. In addition, the client 400 need not be connected to the CNC tool 406; for example, the client 400 may receive data which the user saves on floppy disk or writeable CD for transport to a PC that communicates with the CNC tool 406. Further, the system may be embodied at a kiosk, with variable types of operating configurations as would be understood by one of ordinary skill in the computing arts.

If Internet connections are used to implement the invention, documents for display and printing are sent using a form of Internet protocol, such as transmission control protocol/internet protocol, or TCP/IP. Various standard protocols can be used to format data. For Internet communications generally, hypertext transmission protocol (HTTP) is important. With HTTP, a client computer specifies a uniform resource locator (URL) and a request to access services and retrieve documents. This request is transmitted via HTTP to a computer that can process the request and return a document as a web page. Web pages are typically defined using hypertext markup language (HTML). The extended markup language (XML) can also be used. While HTML provides a standard set of tags that describe the contents of a web page and how it should be displayed, XML provides a standard means of describing any content through the use of user defined tags. The context and meaning of the XML tags is specified through the use of document type definitions (DTD's).

Figure 5:
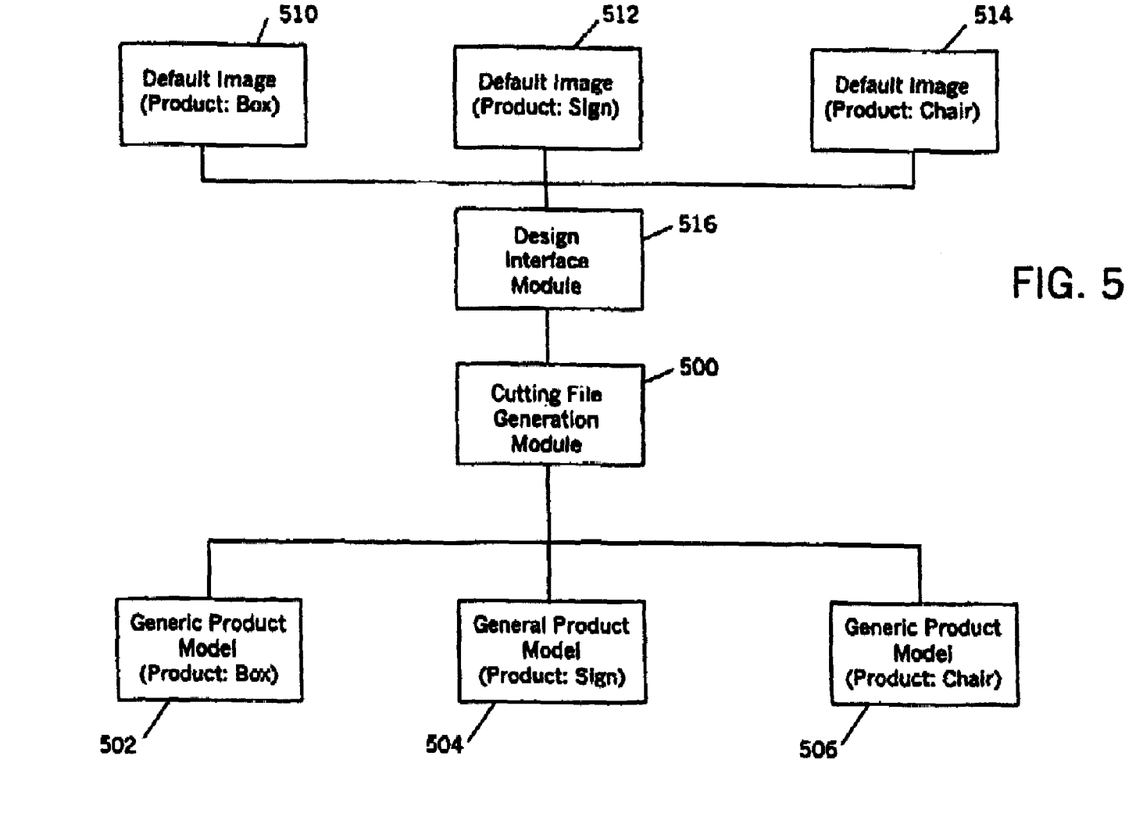
FIG. 5 is a block diagram showing modules and database structure of one embodiment of the invention.

FIG. 5 shows the database and module structure of the present invention. The cutting file generation module 500 resides on the server system 404. The remaining components may reside on the server 404 or the client 400, irrespective of their depicted locations in FIG. 5. Default generic models for particular products 502, 504, 506 are used by the cutting file generation module 500. One example of a type of generic product model includes a cutting file template. A cutting file template might include the structure of a cutting file for a particular product, but include variables rather than specific numbers that represent the design parameters. The final design parameters would be inserted into the template in place of respective appropriate variables to generate the cutting file. Other types of generic models that also could be used to generate cutting files include models based on algorithms, as could be developed by one of ordinary skill in the CNC tool and computing arts. The generic product models 502, 504, 506 may reside on either the server or the client.

In the embodiment of FIG. 5 there are default images 510, 512, 514 corresponding respectively to generic models of a box 502, sign 504, and chair 506, although such products may include any item that may be made with CNC tools. The default images have default design parameters, as discussed with respect to FIGS. 1–3. A design interface module 516 includes executable code that allows a user to modify the default images 510, 512, 514 and then transmit the modifications to the cutting file generation module 500.

The design interface module 516 may be stored on the server, on the client system hard drive, or other client-side media such as a CD-ROM. The design interface module 516 may also run on the server 404, or on the client 400 by a downloaded script such as a Java applet or other program loaded into the client RAM, and provides a graphical user interface (GUI) through which the user can interactively revise the design of the product, as shown by the example of FIGS. 1–3. Such a GUI may be created in accordance with knowledge of one of ordinary skill in the art and the interactive features may vary in accordance with the choice of the designer and still remain within the intent and scope of the present invention.

Figures 6, 6A:
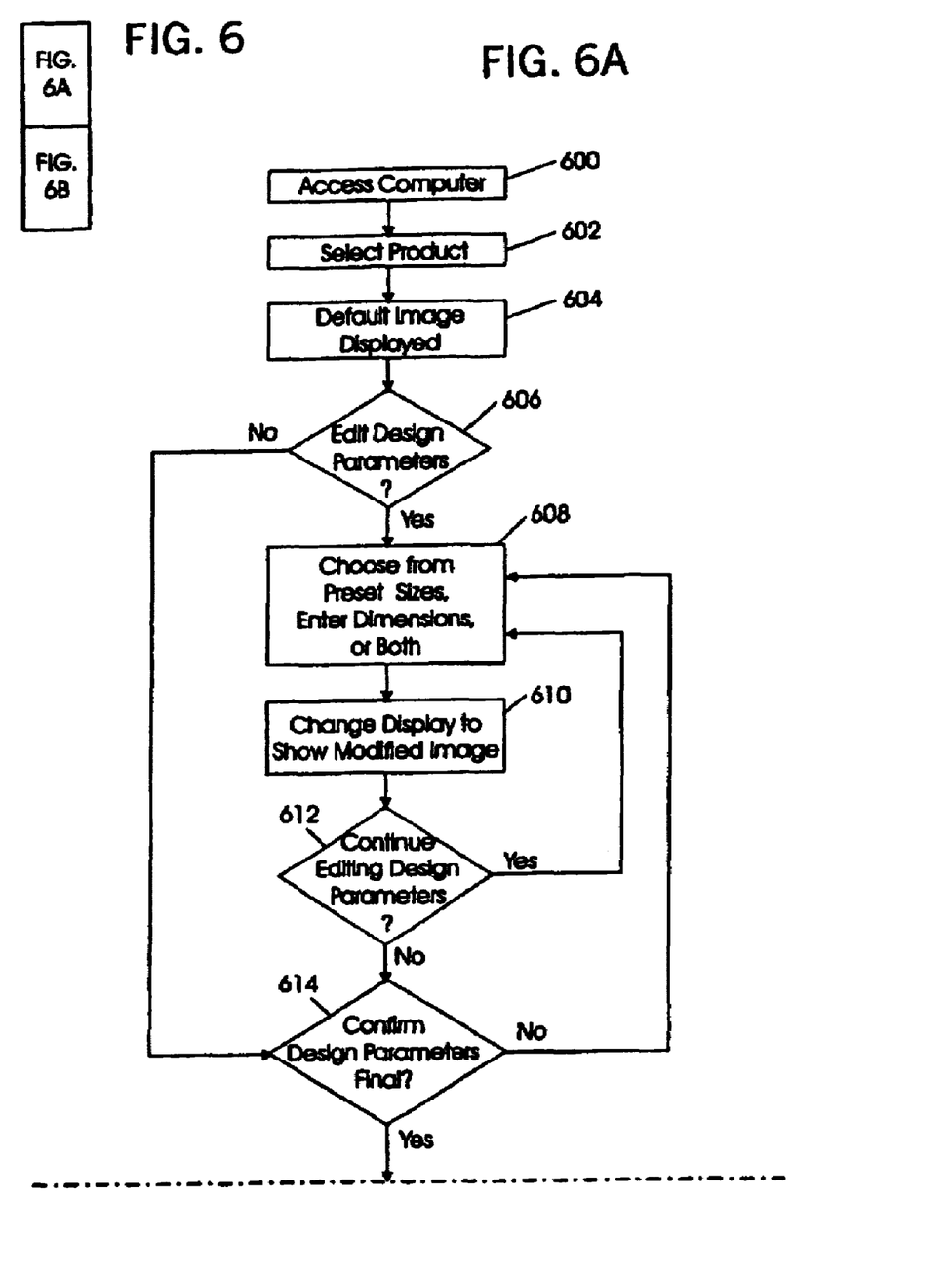
FIG. 6 is a flow chart showing the steps involved in executing one embodiment of the present invention.
Figure 6B:
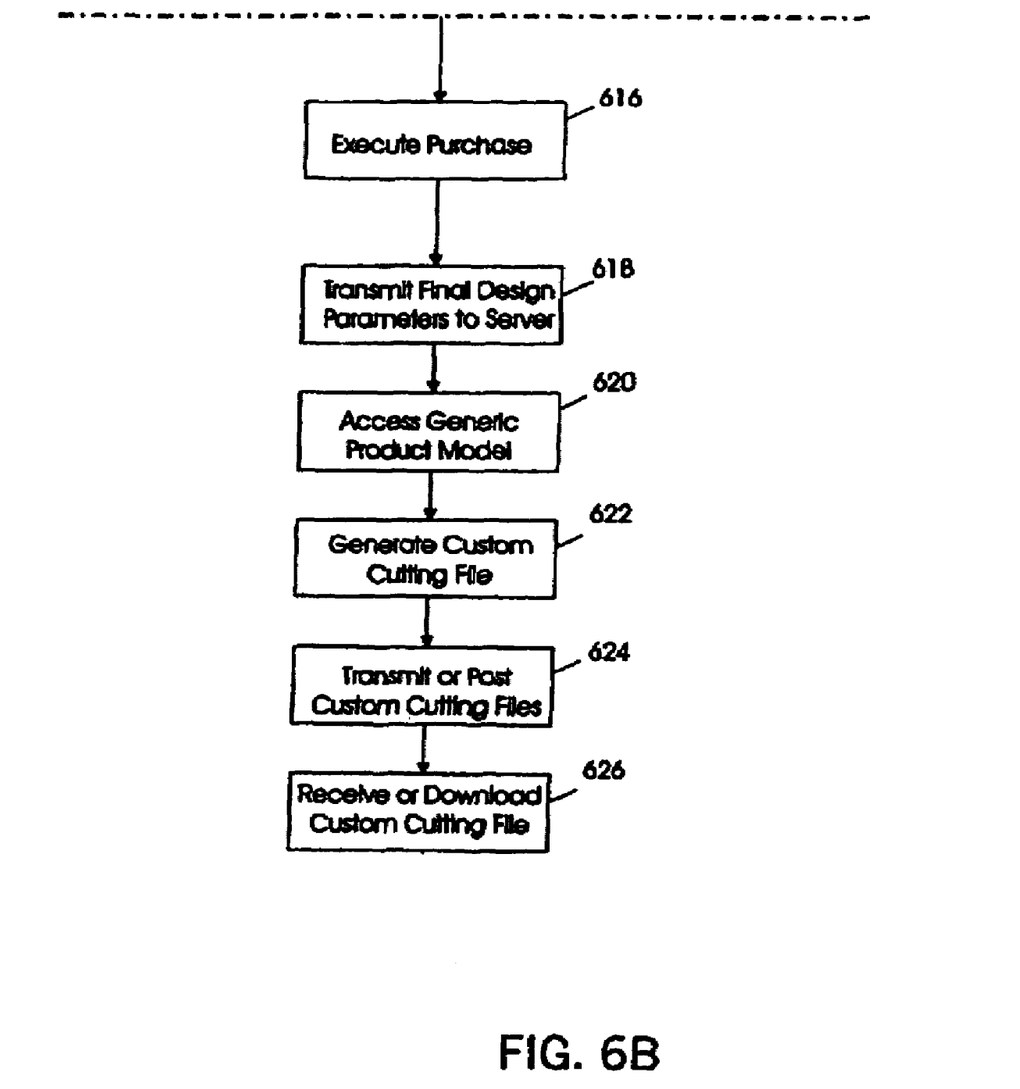

FIG. 6 is a flow chart for describing one embodiment of a method of providing a custom cutting file in accordance with the present invention. This example corresponds the example screens and images shown in FIGS. 1–3. In step 600, a user accesses a computer that is linked by the Internet or other means to the server 404. The user may access the software of the design interface module 516 through its own hard drive, the server 404, or other means. Once the software or web page is initiated, the user selects the desired product 602. The default image is then displayed 604. The user must choose whether to edit the design parameters 606 of the default image, the design parameters being the features such as the dimensions of the product and the blank that will be used to make the product. If the user wants to edit the parameters, a choice must be made regarding selecting preset sizes, editing dimensions, or both 608. Once parameters are entered, if modification is desired, the display will change to show the modified image 610. The user can then decide whether to continue editing design parameters 612 and proceed, after confirmation 614, with executing a purchase 616 of a cutting file. The user may also decline to edit the default dimensions 606 and proceed, again after confirmation 614, with executing the purchase 616 of a cutting file.

The user next transmits the design parameters 618 to the server 404. The file generation module 500 accesses the generic model 620 from either data transmitted by the user or from a database resident on the server, and then generates the custom cutting file 622 on the server 404. In the next step 624 the server will then either transmit the custom cutting file to the user through email or other well know transmission means, or will post the file for electronic retrieval from a web site. The user will receive or retrieve and download the file 626. It should be understood that the above steps may change in their order and still fall within the scope of the present invention. It should also be understood that access to the cutting files may also be directed by the user to a location other than the user's client system, such as to a commercial service that will cut the parts, and still fall within the scope of the present invention.

Figure 7:
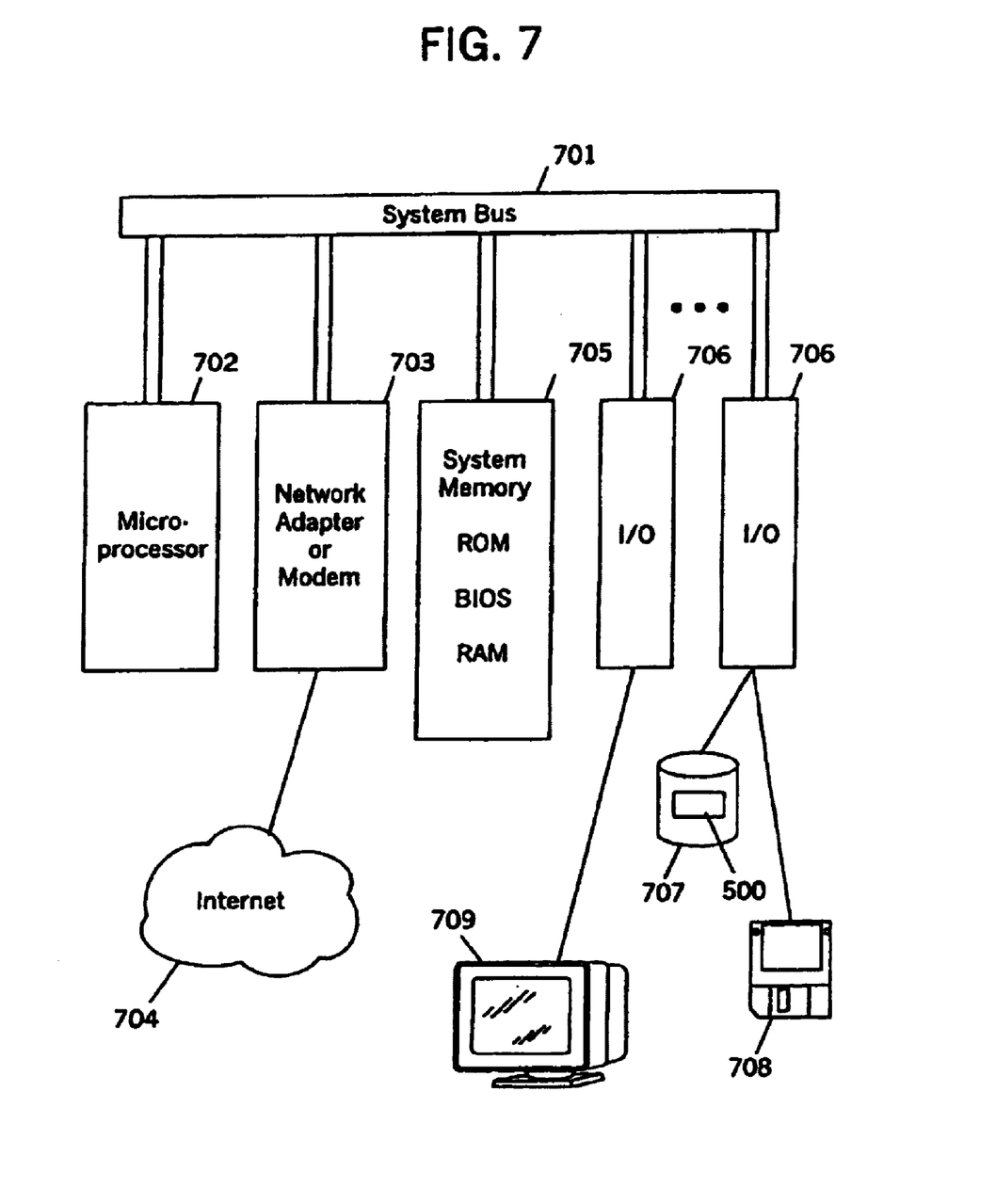
FIG. 7 is a system block diagram of a computer platform implementing a server system according to one embodiment of the invention.

Although the invention may operate within the context of networks, some software that can be used to implement the invention resides on and runs on one or more computer systems, which in various embodiments are personal computers, workstations, or servers, such as might be owned or operated by the CNC file provider. FIG. 7 illustrates further detail of a computer system that implements part of an embodiment in this way. System bus 701 interconnects the major components. The system is controlled by microprocessor 702, which serves as the central processing unit (CPU) for the system. The system includes an I/O device, which may be a network adapter or modem 703 for connection to the Internet 704 or to other types of networks that allow the provider to communicate with clients. System memory 705 is typically divided into multiple types of memory or memory areas, such as read-only memory (ROM), random-access memory (RAM) and others. If the computer system is an IBM compatible personal computer, the system memory also contains a basic input/output system (BIOS). A plurality of other general input/output (I/O) adapters or devices 706, are present. Only two are shown for clarity. These connect to various devices including a fixed disk 707, a diskette drive 708, and a display 709. The computer program instructions for implementing the functions of the file generation module 500 are stored on the fixed disk 707, and are partially loaded into memory 705 and executed by microprocessor 702. It should be noted that the system as shown in FIG. 7 is meant as an illustrative example only. Numerous types of general-purpose computer systems are available and can be used. Available systems include those that run operating systems such as Windows™ by Microsoft and various versions of UNIX. The client/user side of the system may also be similar to the server/CNC file provider system of FIG. 7, with the exception that the file generation module 500 will only be on the server side.

Elements of the invention may be embodied in hardware, in software, or a combination of both (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. Such media are shown in FIG. 7 to represent the diskette drive 708 and the hard disk 707. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Various memory types can be used, for example, to store portions of code at the client that relate to the invention. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the machining, CNC tool, and computing arts will quickly recognize that the invention has other applications in other environments. In fact, many embodiments and implementations are possible. The following claims are in no way intended to limit the scope of the invention to the specific embodiments described above. In addition, the recitation means for is intended to evoke a means-plus-function reading of an element in a claim, whereas, any elements that do not specifically use the recitation means for, are not intended to be read as means-plus-function elements, even if they otherwise include the word means.

What is claimed is:

1. A method for providing a cutting file for a computer numerical control robotic tool to a customer, the method comprising the steps of:
    providing at a site remote from the customer through a public communications network or local area network a generic model for a particular product to be made by the customer with a computer numerical control robotic tool;
    displaying to the customer a representational image of the product corresponding to the particular product and default design parameters for the image;
    allowing the customer to modify through the public communications network or local area network at least one default design parameter and to select final design parameters for the model;
    receiving data corresponding to the final design parameters at the site remote from the customer;
    generating at the remote site using the generic model for a particular product a cutting file that incorporates the final design parameters; and
    making the cutting file available to the customer.

2. The method for providing a cutting file of claim 1, further comprising the steps of:
    generating a final representational image of the product that incorporates the final design parameters; and
    displaying the final representational image to the customer.

3. The method for providing a cutting file of claim 2, wherein the product comprises a plurality of components, and further comprising the steps of:
    generating a representational image of at least one component of the product;
        displaying the individual component image; and
        allowing the customer to specify tool-related data.

4. The method for providing a cutting file of claim 1, wherein the step of making the cutting file available to the customer comprises transmitting the cutting file to the customer from a memory system.

5. The method for providing a cutting file of claim 1, wherein the step of making the cutting file available to the customer comprises storing the cutting file on a memory system accessible to the customer trough a public communications network, and further comprising the step of allowing the customer to access the cutting file.

6. The method for providing a cutting file of claim 1, wherein the step of receiving data comprises receiving data through a public communications network.

7. The method for providing a cutting file of claim 1, further comprising the step of executing a financial transaction in which the customer purchases the cutting file in advance of making the cutting file available to the customer.

8. The method for providing a cutting file of claim 7, wherein the step of executing a financial transaction comprises executing the financial transaction through a public communications network.

9. A method for providing a cutting file for a computer numerical control robotic tool to a customer, the method comprising the steps of:
    providing at a site remote from the customer through a public communications network or local area network a generic model for a particular product to be made by the customer with a computer numerical control robotic tool, wherein the product comprises a plurality of components;
    displaying to the customer a representational image of the product corresponding to the particular product and default design parameters for the image;
    allowing the customer to modify through the public communications network or local area network at least one default design parameter and to select final design parameters for the model;
    generating a customized representational image of the product that incorporates the at least one modified design parameter;
    displaying the customized representational image to the customer;
    generating at least one customized representational image of the individual components;
    displaying the at least one customized individual component image to the customer;
    receiving data corresponding to the final design parameters at a site remote from the customer through a public communications network;
    generating at the remote site using the generic model for a particular product a cutting file that incorporates the final design parameters;
    storing the cutting file on a memory system accessible to the customer through a public communications network;
    executing a financial transaction in which the customer purchases the cutting file through a public communications network; and
    allowing the customer to access the cutting file.

10. Apparatus for providing a cutting file for a computer numerical control robotic tool to a customer, the apparatus comprising:
    means for providing at a site remote from the customer through a public communications network or local area network a generic model for a particular product to be made by the customer with a computer numerical control robotic tool;
    means for displaying to the customer a representational image of the product corresponding to the particular product and default design parameters for the image;
    means for allowing the customer to modify through the public communications network or local area network at least one default design parameter and to select final design parameters for the model;
    means for receiving data corresponding to the final design parameters at the site remote from the customer;
    means for generating at the remote site using the generic model for a particular product a cutting file that incorporates the final design parameters; and
    means for making the cutting file available to the customer.

11. The apparatus for providing a cutting file of claim 10, further comprising:
    means for generating a final representational image of the product that incorporates the final design parameters; and
    means for displaying the final representational image to the customer.

12. The apparatus for providing a cutting file of claim 11, further comprising:
    means for generating a representational image of at least one component of the product;
        means for displaying the individual component image; and
        means for allowing the customer to specify tool-related data.

13. The apparatus for providing a cutting file of claim 10, wherein the means for making the cutting file available to the customer further comprises means for transmitting the file to the customer from a memory system.

14. The apparatus for providing a cutting file of claim 10, wherein the means for making the cutting file available to the customer further comprises means for storing the file on a memory system accessible to the customer through a public communications network, and further comprising means for allowing the customer to access the cutting file.

15. The apparatus for providing a cutting file of claim 10, wherein the means for receiving data further comprises means for receiving data through a public communications network.

16. The apparatus for providing a cutting file of claim 10, further comprising means for executing a financial transaction in which the customer purchases the cutting file in advance of making the cutting file available to the customer.

17. The apparatus for providing a cutting file of claim 16, wherein the means for executing a financial transaction further comprises means for executing the financial transaction through a public communications network.

18. A computer program product for providing a cutting file for a computer numerical control robotic tool to a customer, the computer program comprising:
   instructions far providing at a site remote from the customer through a public communications network or local area network a genetic model for a particular product to be made by the customer with a computer numerical control robotic tool;
   instructions far displaying to the customer a representational image of the product corresponding to the particular product and default design parameters for the image;
   instructions for allowing the customer to modify through the public communications network or local area network at least one default design parameter and to select final design parameters for the model;
   instructions for receiving data corresponding to the final design parameters at the site remote from the customer;
   instructions for generating at the remote site using the genetic model for a particular product a cutting file that incorporates the final design parameters; and
   instructions for making the cutting file available to the customer.

19. The computer program of claim 18, further comprising:
   instructions for generating a final representational image of the product that incorporates the final design parameters; and
   instructions for displaying the customized representational image to the customer.

20. The computer program of claim 18, further comprising:
   instructions for generating a representational image of at least one component of the product:
   instructions for displaying the individual component image; and
   instructions for allowing the customer to specify tool-related data.

21. The computer program of claim 18, wherein the instructions for making the cutting file available to the customer further comprises instructions for transmitting the file to the customer from a memory system.

22. The computer program of claim 18, wherein the instructions for making the cutting file available to the customer further comprises instructions for storing the file on a memory system accessible to the customer through a public communications network, and further comprising instructions for allowing the customer to access the cutting file.

23. The computer program of claim 18, wherein the instructions for receiving data further comprises instructions for receiving data through a public communications network.

24. The computer program of claim 18, further comprising instructions for executing a financial transaction in which the customer purchases the cutting file in advance of making the cutting file available to the customer.

25. The computer program of claim 24, wherein the instructions for executing a financial transaction further comprise instructions for executing the financial transaction through a public communications network.

26. The computer program of claim 18, wherein the instructions for providing a cutting file template further comprise instructions to access a database of generic models for particular products, and the instructions for displaying a representational image of the product corresponding to a particular model further comprise instructions to access a database of representational images.

27. The computer program of claim 26, wherein the computer program is embodied on a plurality of media enabled to operate a plurality of computers systems interconnected by a network.

28. A method for a customer to acquire a cutting file for a computer numerical control robotic tool, the method comprising the steps of:
   viewing a representational image of the product corresponding to a generic model for a product to be made by the customer with a computer numerical control robotic tool and to default design parameters for the image;
   identifying and inputting any desired modifications to the default design parameters, creating final design parameters;
   transmitting data corresponding to the final design parameters through a public communications network or local area network to a site remote from the customer;
   requesting cutting file from the remote site; and receiving the cutting file.

29. The method of claim 28, further comprising the step of viewing a final representational image of the product corresponding to final design parameters.

30. The method of claim 28, further comprising the steps of:
   viewing a representational image of at least one component of the product; and
   inputting tool-related data.

31. The method of claim 28, wherein the step of receiving the cutting file is performed directly from a storage medium.

32. The method of claim 28, wherein tie step of receiving the cutting file is performed through a public communications network.

33. The method of claim 28, wherein the step of transmitting data is performed through a public communications network.

34. The method of claim 28, further comprising the step executing a financial transaction in which the customer purchases the cutting file in advance of receiving the cutting file.

35. The method of claim 34, wherein the financial transaction is executed through a public communications network.

\* \* \* \* \*

UNITED STATES PATENT AND TRADEMARK OFFICE
CERTIFICATE OF CORRECTION

PATENT NO.         : 6,982,731 B2
APPLICATION NO. : 10/065089
DATED              : January 3, 2006
INVENTOR(S)        : Warren Grimes Hall and William L. Young It is certified that error appears in the above-identified patent and that said Letters Patent is hereby corrected as shown below:

Column 7
Line 48, change "trough" to - - through - -.

Column 9
Lines 25 and 30, change "far" to - - for - -.
Lines 27 and 40, change "genetic" to - - generic - -.

Claim 5, col. 7, line 48, by changing "trough" to --through--.

Claim 18, col. 9, lines 25 and 30, by changing "far" to --for--.

Claim 18, col. 9, lines 27 and 40, by changing "genetic" to --generic--.

Signed and Sealed this

Twenty-second Day of August, 2006

JON W. DUDAS
*Director of the United States Patent and Trademark Office*